United States Patent Office 3,182,910
Patented May 11, 1965

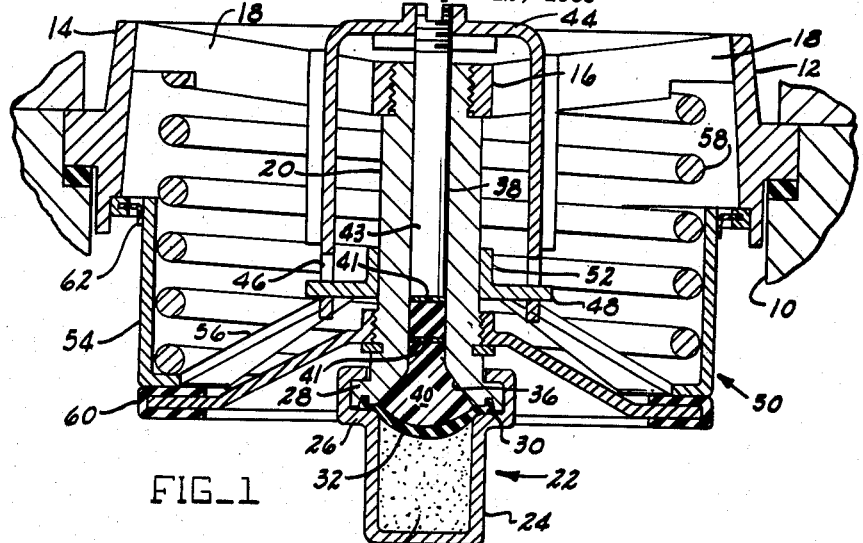
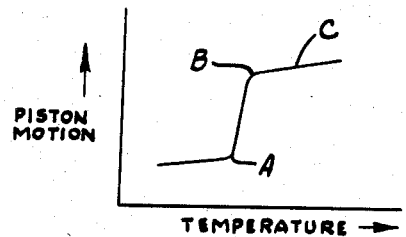
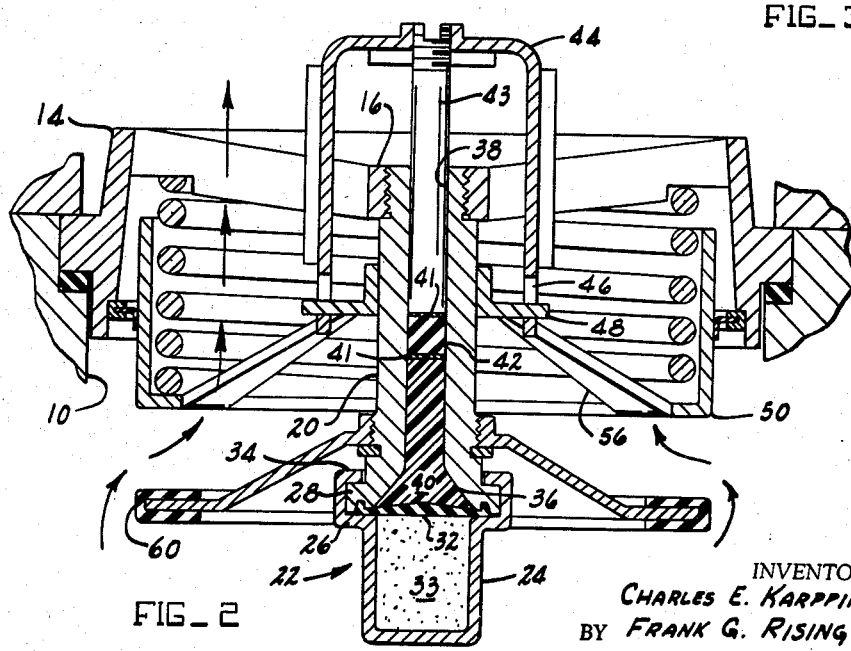

3,182,910
THERMOSTATIC VALVE
Charles E. Karppinen, Royal Oak, and Frank G. Rising, Detroit, Mich., assignors to American Radiator & Standard Sanitary Corporation, New York, N.Y., a corporation of Delaware
Filed Sept. 12, 1963, Ser. No. 308,548
2 Claims. (Cl. 236—34)

This invention relates to a thermostatically operated valve comprising a movable valve element and a thermostatically operated power means responsive to liquid temperature change for moving the valve element toward and away from a fixed valve seat. The invention has application in various fields, as for example thermostats for engine cooling systems.

One object of the invention is to provide a thermostatically-operated valve wherein the power means and valve element are capable of movement through relatively long distances so that the valve can handle large volumetric liquid flows.

A further object is to provide a thermostatically-operated valve wherein the power means is capable of extensive service without leakage, sticking, mechanical breakage, or other malfunction.

A further object of the invention is to provide a thermostatically-operated valve means which is operable in response to a fairly small temperature change.

Another object is to provide a thermostatically-operated valve which can withstand conditions of excessive over-temperature and under-temperature without malfunction.

Other objects of this invention will appear from the following description and appended claims, reference being had to the accompanying drawings forming a part of this specification wherein like reference characters designate corresponding parts in the several views.

In the drawings:

FIGURE 1 is a sectional view through a valve of the invention showing same in its fully closed position;

FIG. 2 is a sectional view showing the FIG. 1 valve in its fully open position; and FIG. 3 is a diagram showing the operating characteristic of the FIG. 1 valve.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to FIG. 1 of the drawings, there is shown a liquid passage means 10 in which is suitably mounted a valve head 12 having an annular outer section 14, an annular inner section 16, and four equidistant radial spokes 18. Central portion 16 is internally threaded to fixedly mount the guide sleeve 20 of a thermostatic power means designated generally by numeral 22.

Power means 22 comprises a rigid metal cup 24 having a radial flange 26 which mates with the radial flange 28 of the guide sleeve 20. Interposed between the two mating flanges is the peripheral portion 30 of an elastomeric diaphragm 32. As is conventional, the diaphragm, cup and guide sleeve are secured together by an inturned peripheral cup flange 34. The diaphragm may be preformed to the configuration shown in U.S. Patent 2,986,936. Its purpose is to seal the thermal expansion material 33 within cup 24. Preferably the expansion material is compounded with finely divided heat conducting particles and a binder as disclosed in U.S. Patent 2,259,846.

It will be seen that guide sleeve 20 is provided with a tapering cavity 36 which has a major diameter corresponding with the internal diameter of cup 24. Thus the elastomeric diaphragm 32 has substantially the same area exposed to cup 24 and cavity 36. This relationship is considered important in that it permits the entire central portion of the diaphragm to undergo axial and radial dimensional change during expansion and contraction of material 33, thereby preventing the occurrence of localized high stress areas in the diaphragm.

As shown in FIG. 1, sleeve 30 is internally contoured to provide a piston guide bore 38 extending upwardly from the smaller end of the tapering cavity 36. A flowable force-transmitting material 40 occupies the tapering cavity and the lower portion of the guide bore. Preferably material 40 comprises discrete resinous particles, such as nylon, dispersed in and coated by a resin, such as polysiloxane, as more particularly disclosed in U.S. Patent 3,059,475. The use of such a flowable force-transmitting material is in lieu of conventional rubber plug materials which are distortable, but not flowable. It has been found that by using a temperature-resistant, flowable force-transmitting material the life of the thermostatic power means can be greatly increased. When conventional rubber force-transmitting plugs are utilized the resistance to plug movement is relatively high so that much of the force developed by the thermal expansion material is dissipated in the force-transmitting material without being applied to the piston. After prolonged service the rubber plugs tend to harden and thus become totally inoperative. On the other hand, flowable force-transmitting plugs as disclosed in U.S. Patent 3,059,475 retain their initial pliability and reshapeability even after prolonged service.

Preferably the flowable force-transmitting material is sealed in the power element by means of two anti-extrusion discs 41 and an interposed rubber plug 42. The discs may be constructed of thin polytetrafluoroethylene sheet material as disclosed in U.S. Patent 2,931,390. The rubber plug is preferably preformed with its length at least as long as its diameter, and with its diameter about 15% oversize relative to the diameter of bore 38. During service the rubber plug exerts radial pressure against the surface provided by bore 38 and thus seals against flow in either direction through the piston-bore clearance space. Discs 41 serve primarily to prevent extrusion of the plug material into the clearance space. The lower disc additionally serves to distribute the pressure of material 40 evenly onto the rubber plug. When the lower disc is not used there is sometimes a tendency for material 40 to exert an uneven pressure on the lower surface of plug 42, thus tending to tilt the plug and destroy the plug's sealing action.

In U.S. Patent 3,059,475 there is shown a sealing arrangement wherein a single anti-extrusion disc is positioned between the flowable force-transmitting material and the piston. It has been found that such an arrangement is not always satisfactory since a single disc by itself cannot effectively seal under all conditions of pressure and temperature encountered during service. The rubber plug as used in combination with the two discs has been found to constitute a very satisfactory seal, even after periods of prolonged service. Under prolonged exposure to elevated temperatures the plug tends to harden somewhat, but such action does not destroy the seal because the plug is not required to change its cross sectional dimension during its back and forth movement. Thus, the plug can undergo considerable hardening and still retain its pressure engagement with the wall of uniform diameter guide bore 38.

In the illustrated construction piston 43 is affixed to a U-shaped yoke 44 which has its terminal portions apertured, as at 46, to form connections with the arms 48 of movable valve element 50. The valve element comprises an inner tubular guide portion 52, an outer tubular flow-throttling portion 54, and four equidistant radial spokes 56. Arms 48 are formed at diametrically spaced points midway between adjacent ones of the spokes. A compression spring 58 is provided to urge the valve element closed against fixed seat 60 in response to contraction of material 33. Flap type seal 62 is provided to prevent bypassing of the liquid around the valve element and direct same as shown by the arrows in FIG. 2.

The illustrated valve element and cooperating valve seat are generally similar to the corresponding elements shown in U.S. patent applicatoin, Serial No. 270,048, filed April 2, 1963 in the name of Charles E. Karppinen, now Patent No. 3,157,356. The present invention is more particularly concerned with the relationship of the power element and valve structure in which the elastomeric diaphragm 32 takes a position depending into cup 24 when the valve element is closed on seat 60. With such an arrangement the valve element is enabled to have a relatively long operating stroke (from its FIG. 1 to its FIG. 2 position), whereby to be capable of handling large volumetric liquid flows.

During an illustrative valve-opening cycle diaphragm 32 is forced upwardly from its FIG. 1 position to its FIG. 2 position in which its central portion is substantially coextensive with the plane of the interface between cup flange 26 and guide flange 28. The diaphragm is displaced upwardly by a relatively small distance, as for example about .1 inch, while piston 42 and valve element 50 are displaced a larger distance, as for example about .35 inch. The amplified piston motion is achieved by construction and elongation of material 40 as it is forced upwardly from large diameter cavity 36 into small diameter bore 38.

Expansion material 33 (usually a mixture of waxes) is chosen to undergo change of state from the solid to the liquid in the temperature range which is to be maintained in the liquid stream. For example, when the liquid is to be maintained within temperatures ranging from 145° to 160° F. the expansion material is selected to begin fusion at about 145° and complete fusion at about 160°. FIG. 3 illustrates the general course of the expansion stroke wherein the piston begins its upward movement at point A (145°) and completes the major portion of its movement at point B (160°).

In most cases the liquid at one time or another rises above the desired temperature range, which causes the piston to move outwardly along portion C of the FIG. 3 curve. During such movement the central portion of diaphragm 32 is displaced upwardly into cavity 36.

In practically all cases the liquid at one time or another falls into a low temperature range, as for example in the neighborhood of 0° F. Material 33 thus contracts and produces a low pressure condition within the power element interior. During such periods elastomeric plug 42 is effective to seal against the admission of ambient liquid into the power element interior.

One noteworthy feature of the illustrated valve-power element arrangement resides in the disposition of diaphragm 32 so that it can undergo substantial vertical displacement between a first position in which its central portion depends into cup 24 and a second position in which its central portion projects upwardly into cavity 36. By this arrangement the flowability characteristics of material 40 are more effectively utilized than under previous practice.

Previously material 40 has been employed in association with corrugated metal diaphragms and tapering cavities. However such diaphragms are very limited in the amount of deflection which they can safely undergo; therefore the flowable force-transmitting material was not used to best advantage, particularly as regards the attainment of large valve element travel. By utilizing the flowable force-transmitting material in association with the illustrated rubber diaphragm, tapering cavity, and sealing plug it is possible to attain a relatively long valve element movement from a relatively small size power element. Long service life is ensured by reason of the described seal, comprising the rubber plug and anti-extrusion discs.

What is claimed:

1. A thermostatically-operated valve comprising a fixed seat and a movable valve element arranged to control the flow of liquid therepast, thermostatically-operated power means responsive to liquid temperature change for moving the valve element toward or away from the seat; said power means comprising a cup and a sleeve extending axially therefrom; an elastomeric diaphragm clamped between the cup and sleeve at the cup-sleeve interface; thermal expansion material sealed within the cup by the diaphragm; said sleeve having a tapering cavity extending from the end thereof which mates with the diaphragm, and a guide bore extending from the smaller end of the tapering cavity; a piston slidably disposed within the guide bore; flowable force-transmitting material occupying the cavity and a portion of the guide bore; and sealing means interposed between the force-transmitting material and piston; said diaphragm having its central portion depending into the cup when the movable valve element is closed against the seat, and said diaphragm having its central portion substantially coextensive with the plane of the cup-sleeve interface when the valve element is in its full open position; said sealing means comprising a radially compressed elastomeric plug, a first anti-extrusion disc between the plug and piston, and a second anti-extrusion disc between the plug and force-transmitting material.

2. A thermosatically-operated valve comprising a fixed seat and a movable valve element arranged to control the flow of liquid therepast, thermostatically-operated power means responsive to liquid temperature change for moving the valve element toward or away from the seat; said power means comprising a cup and a sleeve extending axially therefrom; an elastomeric diaphragm clamped between the cup and sleeve at the cup-sleeve interface; thermal expansion material sealed within the cup by the diaphragm; said sleeve having a tapering cavity extending from the end thereof which mates with the diaphragm, and a guide bore extending from the smaller end of the tapering cavity; a piston slidably disposed within the guide bore; a flowable force-transmitting material occupying the cavity and a portion of the guide bore; and sealing means interposed between the force-transmitting material and piston; said sealing means comprising a radially compressed elastomeric plug, a first anti-extrusion disc between the plug and piston, and a second anti-extrusion disc between the plug and force-transmitting material.

References Cited by the Examiner

UNITED STATES PATENTS

| 2,636,776 | 4/53 | Vernet | 73—358 |
| 2,694,415 | 11/54 | Dillon. | |
| 2,769,597 | 11/56 | Mayo | 236—34 |
| 3,059,475 | 10/62 | Vernet | 73—368.3 |
| 3,075,703 | 1/63 | Freismuth | 236—34 |

EDWARD J. MICHAEL, *Primary Examiner.*